(12) United States Patent
Xu

(10) Patent No.: US 9,852,713 B2
(45) Date of Patent: Dec. 26, 2017

(54) SCREEN CONTROL METHOD AND ELECTRONIC DEVICE

(71) Applicants: Beijing Lenovo Software Ltd., Beijing (CN); Lenovo (Beijing) Co., Ltd., Beijing (CN)

(72) Inventor: Ben Xu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/848,965

(22) Filed: Sep. 9, 2015

(65) Prior Publication Data
US 2016/0351171 A1 Dec. 1, 2016

(30) Foreign Application Priority Data
May 25, 2015 (CN) .......................... 2015 1 0272039

(51) Int. Cl.
 G09G 5/14 (2006.01)
 G06F 1/16 (2006.01)
 G09F 9/30 (2006.01)
 H04M 1/02 (2006.01)

(52) U.S. Cl.
 CPC ............. G09G 5/14 (2013.01); G06F 1/1652 (2013.01); G09F 9/301 (2013.01); *G06F 2203/04102* (2013.01); *G09G 2354/00* (2013.01); *G09G 2370/22* (2013.01); *G09G 2380/02* (2013.01); *H04M 1/0268* (2013.01)

(58) Field of Classification Search
 CPC .. G09G 5/14; G09G 2354/00; G09G 2370/22; G09G 2380/02; G06F 1/1652; G06F 2203/04102; G06F 9/301; H04M 1/0268
 See application file for complete search history.

(56) References Cited

U.S. PATENT DOCUMENTS

| 9,020,571 | B2 | 4/2015 | Chi et al. |
| 9,575,590 | B2 | 2/2017 | Yang |
| 2013/0145311 | A1* | 6/2013 | Joo ..................... G06F 3/04886 715/788 |

(Continued)

FOREIGN PATENT DOCUMENTS

| CN | 103365594 A | 10/2013 |
| CN | 103516840 A | 1/2014 |
| CN | 103838444 A | 6/2014 |

*Primary Examiner* — Jwalant Amin
(74) *Attorney, Agent, or Firm* — Harness, Dickey & Pierce, P.L.C.

(57) ABSTRACT

A screen control method applied to a deformable electronic device is provided, which includes: acquiring attitude information of the electronic device in a case that a first region of a screen of the electronic device is deformed; selecting a second region of the screen based on a second attitude of the electronic device in a case that an attitude of the electronic device is changed from a first attitude to the second attitude; and controlling the second region to be deformed, where the second region is different from the first region. With the method, in a case that the first region of the screen of the electronic device is deformed and the attitude of the electronic device is changed, the deformed region is adjusted based on the changed attitude of the electronic device.

12 Claims, 13 Drawing Sheets

(56) References Cited

U.S. PATENT DOCUMENTS

2013/0265221 A1* 10/2013 Lee .................... G06F 3/01
                                                    345/156
2014/0004906 A1   1/2014 Chi et al.
2014/0146018 A1*  5/2014 Yang .............. G06F 3/03545
                                                    345/175

* cited by examiner

SCREEN CONTROL METHOD AND ELECTRONIC DEVICE

CROSS REFERENCE TO RELATED APPLICATIONS

The present application claims the priority to Chinese Patent Application No. 201510272039.3, titled "SCREEN CONTROL METHOD AND ELECTRONIC DEVICE", filed on May 25, 2015 with the State Intellectual Property Office of People's Republic of China, the content of which is incorporated herein by reference.

FIELD

The present disclosure relates to the field of electronic device, and in particular to a screen control method and an electronic device.

BACKGROUND

With the development of the electronic technology, a deformable flexible screen with good flexibility is developed as the times require. Accordingly, an electronic device including the flexible screen also has good flexibility.

In a conventional electronic device, the flexibility of the flexible screen is used for bending deformation of a fixed portion of the flexible screen, to achieve a split-screen display of the flexible screen.

FIG. 1 shows a schematic structural diagram of an electronic device. As shown in FIG. 1, various application interfaces or desktops are displayed on a main screen 101 of the electronic device, and common information such as time is displayed on a bended portion as a lateral screen 102. The user can view the common information on the lateral screen at any time when using the electronic device.

However, since the lateral screen acquired by bending has a fixed position on the screen, the position of the bended portion relative to the user changes in a case that the attitude of the electronic device is changed, the user can not see the information by using a viewing habit, hence the user needs to divert attention when viewing the common information displayed on the bended portion, thereby resulting in bad experience of the user.

SUMMARY

In view of above, a screen control method is provided according to the present disclosure, which solves a problem that in the conventional flexible screen, a lateral screen acquired by bending has a fixed position and can not be adjusted based on the attitude of the electronic device.

In order to achieve the above object, technical solutions are provided according to the present disclosure hereinafter.

A screen control method applied to a deformable electronic device is provided, which includes:

acquiring attitude information of the electronic device in a case that a first region of a screen of the electronic device is deformed;

determining, based on the attitude information, whether an attitude of the electronic device is changed to obtain a first determination result;

selecting a second region of the screen based on a second attitude of the electronic device in a case that the first determination result indicates that the attitude of the electronic device is changed from a first attitude to the second attitude; and controlling the second region to be deformed, where the second region is different from the first region.

Preferably, first information is displayed on the first region, and after the controlling the second region to be deformed, the method further includes:

controlling the second region to display the first information.

Preferably, in a case that the first determination result indicates that the attitude of the electronic device is changed from the first attitude to the second attitude, the method further includes:

controlling the first region to remove the deformation and to stop displaying the first information.

Preferably, second information may be displayed on the screen, and after the controlling the second region to be deformed, the method further includes:

adjusting, based on the second attitude, a display direction for the second information from a first direction to a second direction, where the first direction is a direction matching the first attitude and the second direction is a direction matching the second attitude.

Preferably, the first information is displayed on the first region of the screen, and after the controlling the second region to be deformed, the method further includes:

controlling the first region to stop displaying the first information; and controlling the second region to display the first information.

Preferably, the electronic device may be provided with at least two sensors, each of the at least two sensors is configured to detect a pressure value of a respective preset region on the screen, and the selecting a second region of the screen based on the second attitude includes:

acquiring pressure values collected by the sensors;

analyzing the pressure values to obtain a first coordinate range of the deformed first region;

analyzing the first coordinate range to obtain a relative direction of the first region relative to the screen in a case that the electronic device is in the first attitude; and selecting, based on the second attitude, a second coordinate range corresponding to the relative direction on the screen and determining a region corresponding to the second coordinate range as the second region.

Preferably, the controlling the second region to be deformed includes:

analyzing the pressure values to obtain a deformation parameter of the deformed first region; and controlling, based on the deformation parameter, the second region to be deformed, where the deformation of the second region matches the deformation of the first region.

Preferably, the screen is divided into at least four standard regions, each of the at least four standard regions is provided with a respective power supply circuit, and the controlling, based on the deformation parameter, the second region to be deformed includes:

analyzing the second coordinate range corresponding to the second region to obtain at least one standard region corresponding to the second region;

determining, based on the deformation parameter of the first region and a preset correspondence between deformation and voltage, a voltage corresponding to the deformation of the second region; and controlling to apply the voltage corresponding to the deformation of the second region to the at least one standard region corresponding to the second region.

Preferably, before the acquiring attitude information of the electronic device, the method further includes:

receiving first information input by an operator in a preset operation region of the electronic device;

determining whether the first information meets a preset rule to obtain a second determination result; and acquiring the attitude information of the electronic device in a case that the second determination result indicates that the first information meets the preset rule.

An electronic device is provided, which includes:

a deformable screen;

a processor connected to the screen and configured to: acquire attitude information of the electronic device in a case that a first region of the screen of the electronic device is deformed; determine whether an attitude of the electronic device is changed based on the attitude information to obtain a first determination result; select a second region of the screen based on a second attitude of the electronic device, in a case that the first determination result indicates that the attitude of the electronic device is changed from a first attitude to the second attitude; and control the second region to be deformed, where the second region is different from the first region; and a casing for bearing the screen and the processor, where the casing can be deformed, which matches the deformation of the screen.

Preferably, in the electronic device, the first region of the screen is configured for displaying first information, the second region of the screen is configured for displaying the first information, and the region of the screen is configured for displaying second information.

Preferably, the electronic device further includes:

at least two sensors arranged at at least two preset positions of the electronic device, where each of the at least two sensors is configured to detect a pressure value of a respective preset region on the screen.

According to the above technical solutions, as compared with the conventional technology, a screen control method applied to a deformable electronic device is provided according to the present disclosure, which includes: acquiring attitude information of the electronic device in a case that a first region of a screen of the electronic device is deformed; selecting a second region of the screen based on a second attitude of the electronic device, in a case that an attitude of the electronic device is changed from a first attitude to the second attitude; and controlling a second region to be deformed, where the second region is different from the first region. With the method, in a case that the first region of the screen of the electronic device is deformed and the attitude of the electronic device is changed, the deformed region is adjusted based on the changed attitude of the electronic device, such that the deformed region to be located at a corresponding position based on the attitude of the electronic device, which ensures that for the user, the deformed region of the electronic device can change as the attitude of the electronic device changes, and the position of the deformed region does not change relative to the user, thereby meeting the usage habit of the user and improving user experience.

BRIEF DESCRIPTION OF THE DRAWINGS

In order to illustrate technical solutions in embodiments of the present disclosure or in the conventional technology more clearly, technical solutions of the embodiments of the present disclosure will be illustrated completely and clearly in combination with the following drawings of the embodiments of the disclosure. Apparently, the described embodiments are merely a few rather than all of the embodiments of the present disclosure. All other embodiments obtained by persons of ordinary skill in the art based on the embodiment of the present disclosure without creative efforts shall fall within the protection scope of the present disclosure.

DETAILED DESCRIPTION OF THE EMBODIMENTS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

Figure 1:
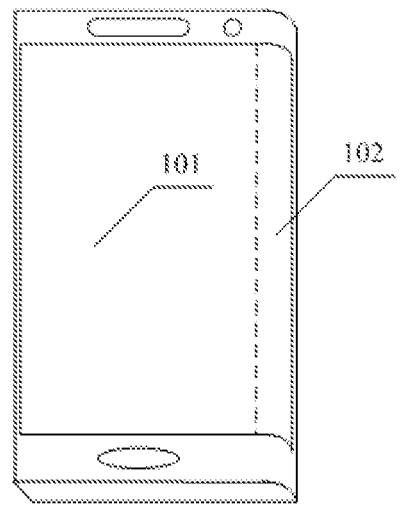
FIG. 1 is a schematic structural diagram of a conventional electronic device.
Figure 2:
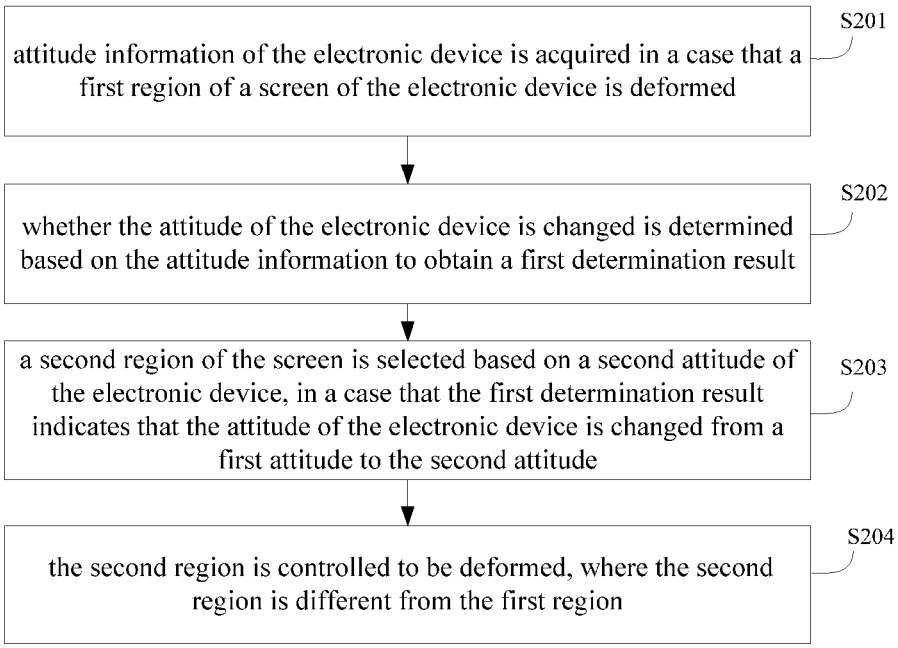
FIG. 2 is a flowchart of a first embodiment of a screen control method according to the present disclosure.

FIG. 2 is a flowchart of a first embodiment of a screen control method according to the present disclosure. The method is applied to a deformable electronic device. The electronic device can be deformed by an external force, and the electronic device may be a desktop computer, a notebook computer, a tablet computer, a mobile phone, a smart television, a smart watch or a wearable device.

The method may include the following steps S201 to S204.

In step S201, attitude information of the electronic device is acquired in a case that a first region of a screen of the electronic device is deformed.

In a case that the electronic device is deformed by an external force, a corresponding region of the screen is also deformed, that is, the first region of the screen is deformed.

In a specific implementation, first information may be displayed on the deformed first region of the screen of the electronic device where the first information may be common information such as time or a weather report.

Specifically, the electronic device is provided with a graphic processing unit (GPU) and controls a content displayed on the screen through the CPU. In the embodiment, an image may be displayed independently on the first region by controlling the GPU.

In a specific implementation, image display may be controlled independently by a part of modules of GPU; or a module of GPU may alternatively control the content displayed on the first region and the content displayed on other region of the screen. The way for controlling the content displayed on the first region and the content displayed on other region of the screen by the GPU is not limited in the embodiment.

The attitude information of the electronic device includes various types of information indicating the attitude of the electronic device, such as a horizontal screen attitude and a vertical screen attitude.

In a specific implementation, the electronic device is provided with devices such as a gravity sensor and a six-axis gyroscope, which can detect the attitude of the electronic device, to acquire the attitude information of the electronic device.

It should be noted that, in the embodiment, the attitude information of the electronic device is detected by the gravity sensor and the six-axis gyroscope, which is not limited herein; and in a specific implementation, the attitude of the electronic device may also be detected by other apparatuses or devices.

It should be noted that, the horizontal screen attitude of the electronic device is not limited to a state in which a longer edge of the electronic device is parallel with the horizontal plane and may be a state in which an angle between the longer edge and the horizontal plane is smaller than a preset angle, such that a content is displayed on the electronic device based on the horizontal screen attitude. The vertical screen attitude has the same principle as the horizontal screen attitude, which is not described herein.

In step S202, whether the attitude of the electronic device is changed is determined based on the attitude information to obtain a first determination result.

The change of the attitude of the electronic device may be a transition from the horizontal screen attitude to the vertical screen attitude, or may be a transition from the vertical screen attitude to the horizontal screen attitude.

In a specific implementation, the attitude information of the electronic device may be acquired in real time; latest attitude information acquired is compared with attitude information acquired in the last period and whether the attitude of the electronic device is changed is determined based on the comparison result. In a case that the latest attitude information is the same as the attitude information acquired in the last period, it is determined that the attitude of the electronic device is not changed; In a case that the latest attitude information is not the same as the attitude information acquired in the last period, it is determined that the attitude of the electronic device is changed.

Specifically, in a case that the attitude of the electronic device is changed, it is indicated that a posture of a user with respect to holding the electronic device or a posture of a placement of the electronic device is changed, thereby resulting in change of the position of the deformed first region of the screen of the electronic device relative to the user.

In step S203, a second region of the screen is selected based on a second attitude of the electronic device, in a case that the first determination result indicates that the attitude of the electronic device is changed from a first attitude to the second attitude.

In a case that the first determination result indicates that the attitude of the electronic device is changed, for example, the attitude of the electronic device is changed from the first attitude to the second attitude, where the first attitude and the second attitude represent different attitudes.

Specifically, in a case that the attitude of the electronic device is changed from the first attitude to the second attitude, the second region is selected from the screen of the electronic device based on the second attitude, where the second region is different from the first region.

In a specific implementation, the position of the second region relative to the user is the same as the position of the first region relative to the user. For example, if the first region is located on the right side of the user, the second region is a region of the screen located on the right side of the user in a case that the attitude of the electronic device is changed, thereby ensuring that the user can continue his usage habit.

It should be noted that, the way for selecting the second region of the screen will be described in detail in subsequent embodiments, which is not described in this embodiment.

In step S204, the second region is controlled to be deformed, where the second region is different from the first region.

After the second region is selected, the second region is controlled to be deformed. The manner and extent of the deformation of the second region may refer to the deformation of the first region.

It should be noted that, in a case that the first region of the screen of the electronic device is deformed, and the attitude of the electronic device is changed from the first attitude to the second attitude, the deformed region is adjusted based on the second attitude, such that the deformed region is adjusted to be located at a position corresponding to the position where the deformed region is located before the change of the attitude, based on the attitude of the electronic device, which ensures that for the user, the deformed region of the electronic device can change as the attitude of the electronic device changes, and the position of the deformed region does not change relative to the user, thereby meeting the usage habit of the user and improving user experience.

In view of above, the screen control method applied to a deformable electronic device includes: acquiring attitude information of the electronic device in a case that a first region of a screen of the electronic device is deformed; selecting a second region of the screen based on a second attitude of the electronic device in case that the attitude of the electronic device is changed from a first attitude to the second attitude; and controlling the second region to be deformed, where the second region is different from the first region. With the method, in a case that the first region of the screen of the electronic device is deformed, and the attitude of the electronic device is changed, the deformed region is adjusted based on the changed attitude of the electronic device, such that the deformed region is adjusted to be located at a corresponding position based on the attitude of the electronic device, which ensures that for the user, the deformed region of the electronic device can change as the attitude of the electronic device changes, and the position of the deformed region does not change relative to the user, thereby meeting the usage habit of the user and improving user experience.

The first information is displayed on the first region, and the content displayed on the first region is different from the content displayed in other region of the screen.

Figure 3:
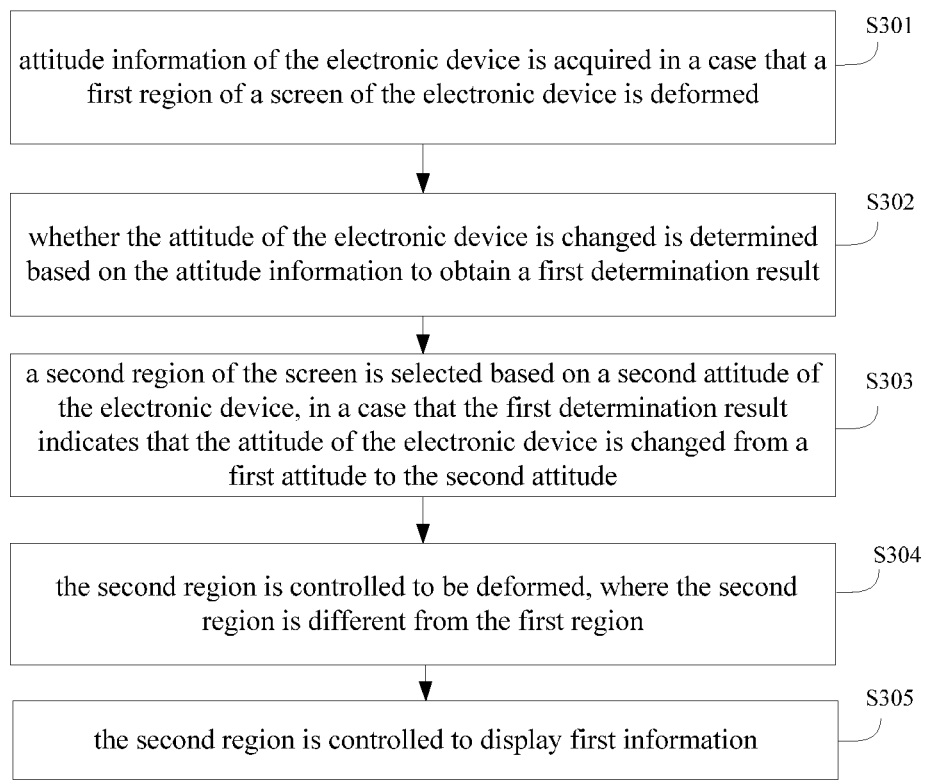
FIG. 3 is a flowchart of a second embodiment of a screen control method according to the present disclosure.

FIG. 3 is a flowchart of a second embodiment of a screen control method according to the present disclosure. The method may include following steps S301 to S305.

In step S301, attitude information of the electronic device is acquired in a case that a first region of a screen of the electronic device is deformed.

In step S302, whether an attitude of the electronic device is changed is determined based on the attitude information to obtain a first determination result.

In step S303, a second region of the screen is selected based on a second attitude of the electronic device, in a case that the first determination result indicates that the attitude of the electronic device is changed from a first attitude to the second attitude.

In step S304, the second region is controlled to be deformed, where the second region is different from the first region.

Step S301 to step S304 are the same as step S201 to step S204 in the first embodiment, which are not described in the embodiment.

In step S305, the second region is controlled to display first information.

In a case that the second region of the screen of the electronic device is deformed, the second region is taken as a display region for the first information.

In a specific implementation, in a case that the second region is deformed, the content displayed on the screen of the electronic device is controlled by the GPU, such that the second region may be controlled to display the first information.

It should be noted that, in a case that the first region of the screen of the electronic device is deformed, and the attitude of the electronic device is changed, the deformed region is adjusted based on the changed attitude of the electronic device, the second region of the screen of the electronic device is controlled to be deformed and the first information is displayed on the second region, such that the electronic device adjusts the deformed region to a corresponding position based on the attitude of the electronic device, which ensures that for the user, the deformed region of the electronic device can change as the attitude of the electronic device changes, the position of the deformed region does not change relative to the user, the region for displaying the first information is not changed relative to the user, and the user can view the information directly by using a viewing habit, thereby meeting the usage habit of the user and improving user experience. In view of above, in the screen control method according to the embodiment, the first information is displayed on the first region and after the second region is controlled to be deformed, the method further includes: controlling the second region to display the first information. With the method, in a case that the first region of the screen of the electronic device is deformed and the attitude of the electronic device is changed, the deformed region is adjusted based on the changed attitude of the electronic device, the second region of the screen of the electronic device is controlled to be deformed and the first information is displayed on the second region, such that the electronic device adjusts the deformed region to be located at a corresponding position based on the attitude of the electronic device, which ensures that for the user, the deformed region of the electronic device can change as the attitude of the electronic device changes, the position of the deformed region does not change relative to the user, the region for displaying the first information is not changed relative to the user, and the user can view the information directly by using the viewing habit, thereby meeting the usage habit of the user and improving user experience.

Figure 4:
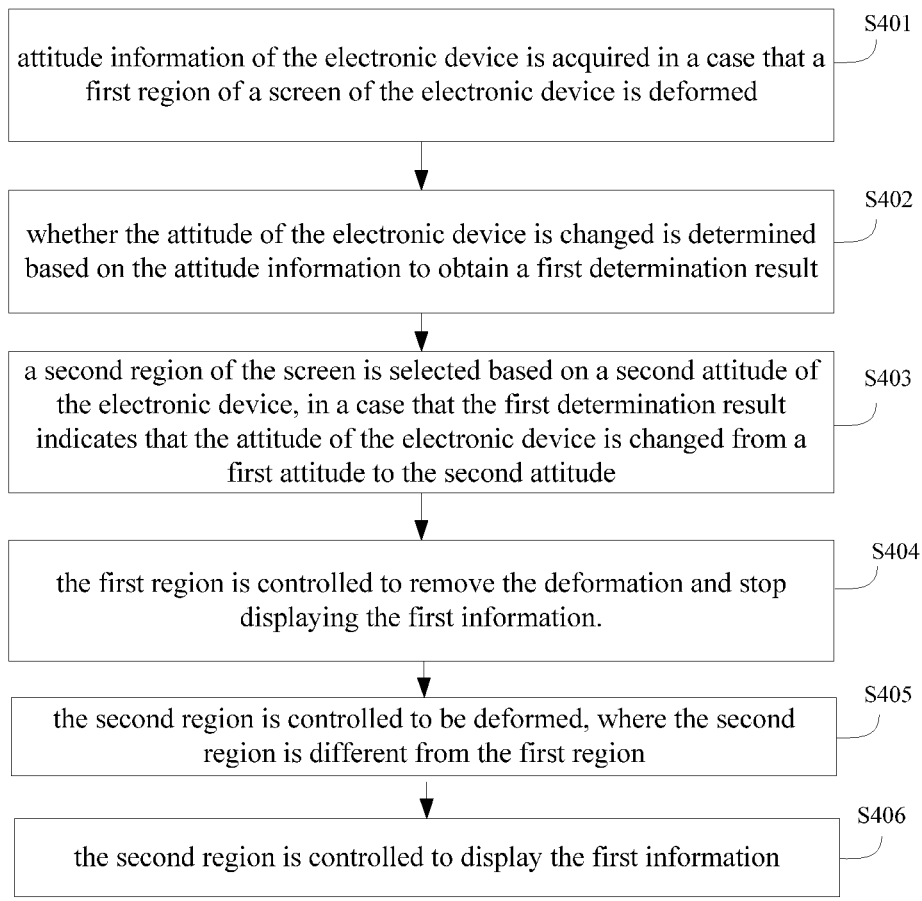
FIG. 4 is a flowchart of a third embodiment of a screen control method according to the present disclosure.

FIG. 4 is a flowchart of a third embodiment of a screen control method according to the present disclosure.

In step S401, attitude information of the electronic device is acquired in a case that a first region of a screen of the electronic device is deformed.

In step S402, whether an attitude of the electronic device is changed is determined based on the attitude information to obtain a first determination result.

In step S403, a second region of the screen is selected based on a second attitude of the electronic device, in a case that the first determination result indicates that the attitude of the electronic device is changed from a first attitude to the second attitude.

Step S401 to step S403 are the same as step S301 to step S303 in the second embodiment, which are not described in the embodiment.

In step S404, the first region is controlled to remove the deformation and to stop displaying the first information.

In a case that the first determination result indicates that the attitude of the electronic device is changed, the first region is controlled to remove the deformation, to be recovered to an initial state, and to stop displaying the first information.

Specifically, the initial state refers to a state in which the first region is flush with adjacent region of the screen of the electronic device.

It should be noted that, in a case that the deformation of the first region is removed and the first region is recovered to the initial state, the first region and the region of the screen of the electronic device adjacent to the first region form a plane, and the plane has a large area and may be used to display a display content with large size. In order to ensure an integrity of a display content, the same display content may be displayed in the plane formed by the first region and the region of the screen of the electronic device adjacent to the first region, which needs to control the first region to stop displaying the first information.

In addition, for continuing displaying the first information to make the user acquire the first information, the first information is displayed on the second region in subsequent step S406, thereby avoiding that a same content is displayed on two regions of the screen of the electronic device which results in occupation of many regions of the screen of the electronic device.

It should be noted that, the process of selecting a second region of the screen based on the second attitude and the process of controlling the first region to remove deformation and stop displaying the first information may be performed simultaneously or in a reverse order, which is not limited in the embodiment.

In step S405, the second region is controlled to be deformed, where the second region is different from the first region.

In step S406, the second region is controlled to display the first information.

Step S405 to step S406 are the same as step S305 to step S306 in the second embodiment, which are not described in the embodiment.

Figure 5:
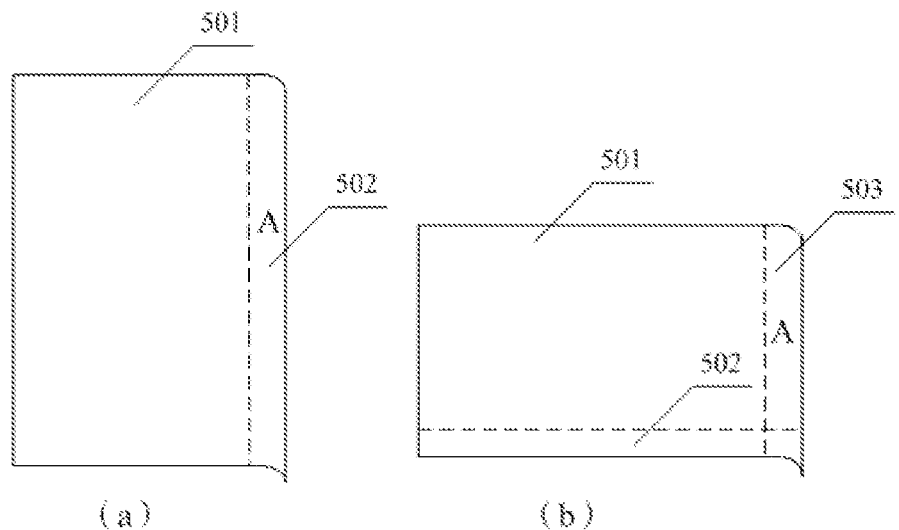
FIG. 5 is a schematic diagram of a screen of an electronic device in two attitudes according to the third embodiment of the screen control method of the present disclosure.

FIG. 5(a) and FIG. 5(b) show schematic diagrams of a screen of an electronic device in two attitudes according to an embodiment of the present disclosure. Specifically, FIG. 5(*a*) shows a schematic diagram of the screen in the first attitude and FIG. 5(*b*) shows a schematic diagram of the screen in the second attitude.

As shown in FIG. 5(*a*), in a case that the electronic device is in the first attitude, i.e., a vertical screen attitude, a first region 502 of a screen 501 of the electronic device is deformed, and first information A is displayed on the first region. As shown in FIG. 5(*b*), in a case that the electronic device is in the second attitude, i.e., a horizontal screen attitude, the first region 502 of the screen 501 of the electronic device is recovered to an initial state and does not display the first information; and a second region 503 is deformed and the first information A is displayed on the second region 503.

It should be noted that, in a specific implementation, in a case that the screen of the electronic device is deformed, a content displayed on the screen of the electronic device may be controlled by the GPU, such that the first region is controlled to stop displaying the first information and the second region is controlled to display the first information.

In view of above, in the screen control method according to the embodiment, in a case that the first determination result indicates that the attitude of the electronic device is changed from the first attitude to the second attitude, the method further includes: controlling the first region to remove the deformation and to stop displaying the first information. With the method, in a case that the first region of the screen of the electronic device is deformed and the attitude of the electronic device is changed, the deformed region is adjusted based on the changed attitude of the electronic device, the deformed region of the screen of the electronic device is adjusted from the first region to the second region; the first region is stopped to display the first information; and the second region is deformed, the first information is displayed on the second region, which ensures that for the user, the deformed region of the electronic device can change as the attitude of the electronic device changes, the position of the deformed region does not change relative to the user, the region for displaying the first information is not changed relative to the user, and the user can view the information directly by using a viewing habit, thereby meeting the usage habit of the user and improving user experience.

Second information is displayed on the screen of the electronic device, where the second information is different from the first information.

Figure 6:
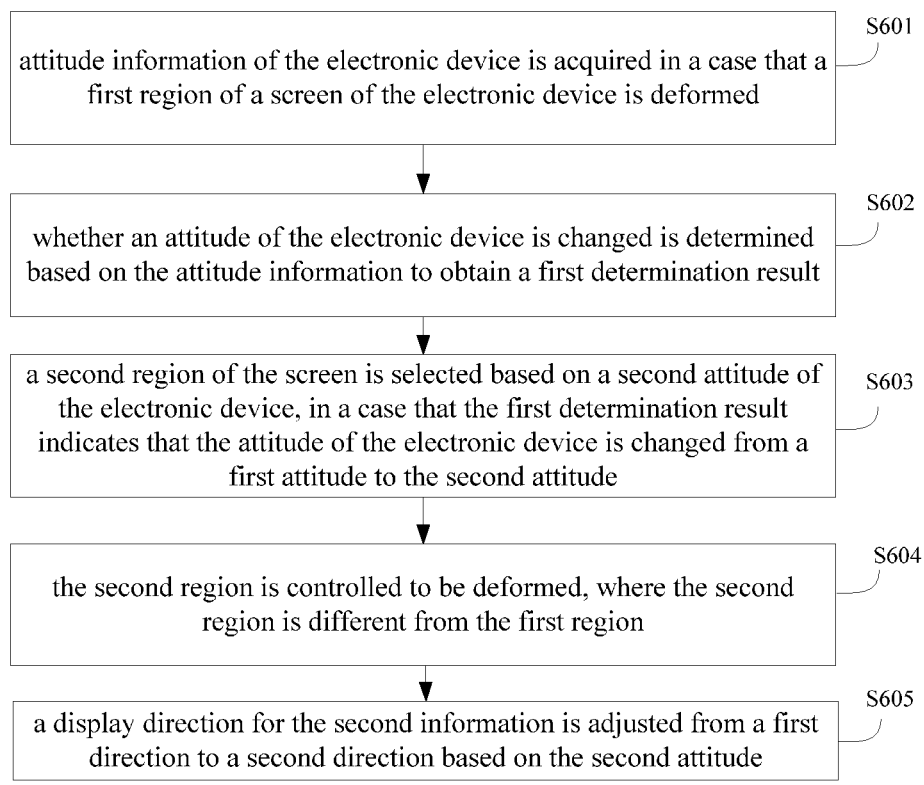
FIG. 6 is a flowchart of a fourth embodiment of a screen control method according to the present disclosure.

FIG. 6 is a flowchart of a fourth embodiment of a screen control method according to the present disclosure. The method may include following step S601 to step S605.

In step S601, attitude information of the electronic device is acquired in a case that a first region of a screen of the electronic device is deformed.

In step S602, whether an attitude of the electronic device is changed is determined based on the attitude information to obtain a first determination result.

In step S603, a second region of the screen is selected based on a second attitude of the electronic device, in a case that the first determination result indicates that the attitude of the electronic device is changed from a first attitude to the second attitude.

In step S604, the second region is controlled to be deformed, where the second region is different from the first region.

Step S601 to step S604 are the same as step S201 to step S204 in the first embodiment, which are not described in the embodiment.

In step S605, a display direction for the second information is adjusted from a first direction to a second direction based on the second attitude.

The first direction is a direction matching the first attitude and the second direction is a direction matching the second attitude.

Specifically, in a case that the attitude of the electronic device is changed, the display direction for a content displayed on the screen of the electronic device is adjusted based on the second attitude, so as to adapt to the viewing requirement of the user.

Furthermore, in the conventional technology, in a case that the deformed region of the electronic device is a region held by the user, the user needs to unroll the curled portion of the flexible screen and bend the held region of the flexible screen for forming deformation, to change the display direction, the process of which is complicated, and since the bending force by the user is uncertain, the flexible screen of the electronic device is likely to be damaged. With the method according to the embodiment, the deformed region is adjusted automatically based on the attitude of the electronic device, without adjusting the deformed region manually by the user, thereby avoiding damage to the screen of the electronic device caused by an uneven force by the user, and extending a service life of the flexible screen of the electronic device.

In view of above, in the screen control method according to the embodiment, the second information is displayed on the screen and after the second region is controlled to be deformed, the method further includes: adjusting a display direction for the second information from a first direction to a second direction based on the second attitude, where the first direction is a direction matching the first attitude and the second direction is a direction matching the second attitude. With the method, in a case that the attitude of the electronic device is changed, the display direction for the content displayed on the screen of the electronic device is adjusted based on the second attitude, so as to adapt to the viewing requirement of the user.

Figure 7:
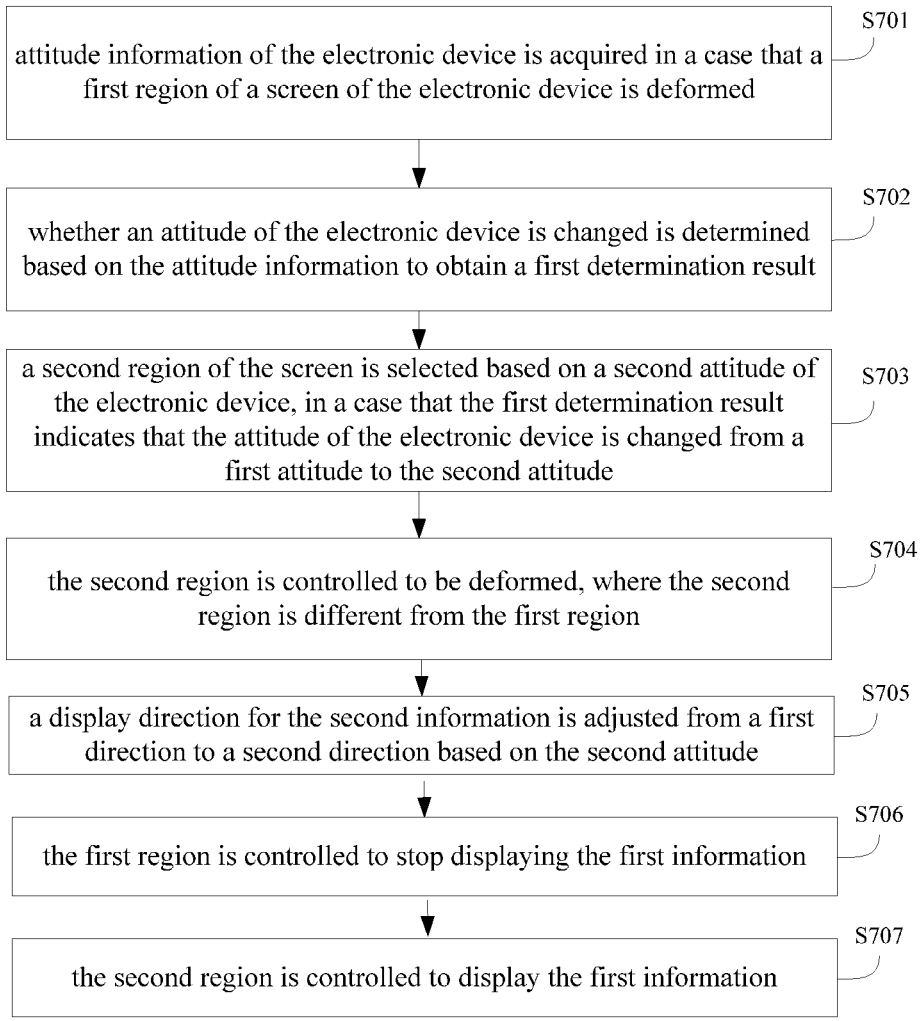
FIG. 7 is a flowchart of a fifth embodiment of a screen control method according to the present disclosure.

FIG. 7 is a flowchart of a fifth embodiment of a screen control method according to the present disclosure. The method may include the following step S701 to step S707.

In step S701, attitude information of the electronic device is acquired in a case that a first region of a screen of the electronic device is deformed.

In step S702, whether an attitude of the electronic device is changed is determined based on the attitude information to obtain a first determination result.

In step S703, a second region of the screen is selected based on a second attitude of the electronic device, in a case that the first determination result indicates that the attitude of the electronic device is changed from a first attitude to the second attitude.

In step S704, the second region is controlled to be deformed, where the second region is different from the first region.

In step S705, a display direction for the second information is adjusted from a first direction to a second direction based on the second attitude.

Step S701 to step S705 are the same as step S601 to step S605 in the fourth embodiment, which are not described in the embodiment.

In step S706, the first region is controlled to stop displaying the first information.

In step S707, the second region is controlled to display the first information.

In a case that the second region is controlled to be deformed, the first region may be controlled to remove the deformation, and the first region is recovered to an initial state.

Specifically, the initial state refers to a state in which the first region is flush with a region on the screen of the electronic device adjacent to the first region.

In this case, a display position for the first information is changed from the first region to the second region, that is, the first region is controlled to stop displaying the first information and the second region is controlled to display the first information.

It should be noted that, in a case that the first region is deformed, the first region is exclusively used for displaying the first information. In a case that the attitude of the electronic device is changed to the second attitude, the first information may be displayed on the deformed second region, and the first region does not need to display the first information. In a case that the first region is empty, particularly the first region occupies a large area, the overall display region of the screen of electronic device may be affected. In a case that the attitude of the electronic device is changed to the second attitude, the display position for the second information is adjusted to be outside the deformed second region, and the first region is used to display content supplementing the original content displayed on the second region, thereby ensuring the whole display effect of the screen.

In a specific implementation, the content displayed on the screen of the electronic device is controlled by the GPU. In the embodiment, the deformed region of the screen may display an independent image by controlling the GPU, and the remaining region displays an image, thereby displaying an independent image on the deformed region.

Figure 8:
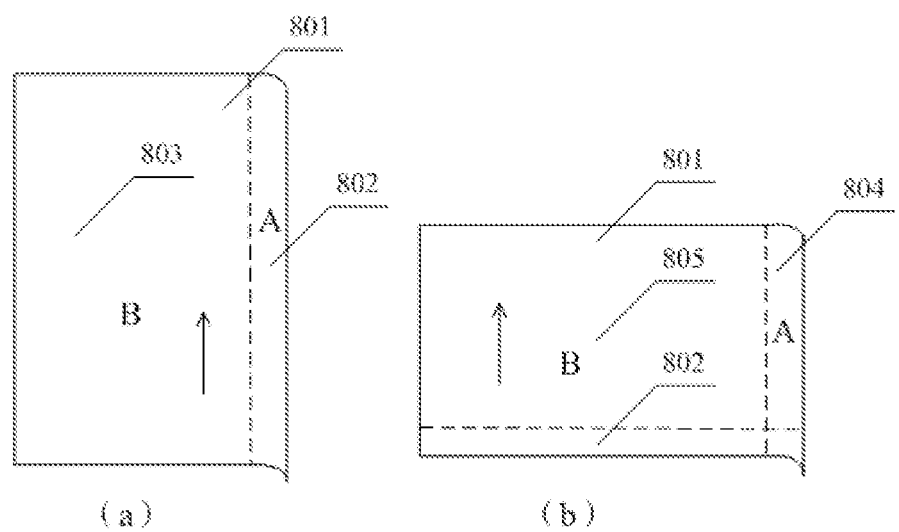
FIG. 8 is a schematic diagram of a screen of an electronic device in two attitudes according to the fifth embodiment of the screen control method of the present disclosure.

FIG. 8(a) and FIG. 8(b) show schematic diagrams of a screen of an electronic device in two attitudes according to an embodiment of the present disclosure. FIG. 8(a) shows a schematic diagram of the screen in a first attitude and FIG. 8(b) shows a schematic diagram of the screen in a second attitude.

As shown in FIG. 8(a), in a case that the electronic device is in the first attitude, i.e., a vertical screen attitude, a first region 802 of a screen 801 of the electronic device is deformed, first information A is displayed on the first region 802, and second information B is displayed on a remaining region 803 of the screen. A display direction for the second information matches a display direction for the first attitude of the electronic device, and an arrow direction indicates an upward direction for a font of the displayed content. As shown in FIG. 8(b), in a case that the electronic device is in the second attitude, i.e., a horizontal screen attitude, the first region 802 of the screen 801 of the electronic device is recovered to an initial state and the first information A is not displayed on the first region 802; a second region 804 is deformed, the first information A is displayed on the second region 804, and second information B is displayed on a region consisting of the first region 802 and a remaining region 805, where the remaining region 805 is a region on the screen other than the first region 802 and the second region 804. The display direction for the second information matches a display direction for the second attitude of the electronic device, and an arrow indicates an upward direction for the font of the displayed content.

In view of above, in the screen control method according to the embodiment, the first information is displayed on the first region of the screen, and after the second region is controlled to be deformed, the method further includes: controlling the first region to stop displaying the first information; and controlling the second region to display the first information. With the method, in a case that the first region of the screen of the electronic device is deformed and the attitude of the electronic device is changed, the deformed region is adjusted based on the changed attitude of the electronic device, the deformed region of the screen of the electronic device is controlled to be adjusted from the first region to the second region; the first region is stopped to display the first information, the second region is deformed and the first information is displayed on the second region, which ensures that for the user, the deformed region of the electronic device can change as the attitude of the electronic device changes, the position of the deformed region does not change relative to the user, the region for displaying the first information is not changed relative to the user, and the user can view the information directly by using a viewing habit, thereby meeting the usage habit of the user and improving user experience.

The electronic device is provided with at least two sensors, and each of the at least two sensors is configured to detect a pressure value of a respective preset region of the screen of the electronic device.

Figure 9:
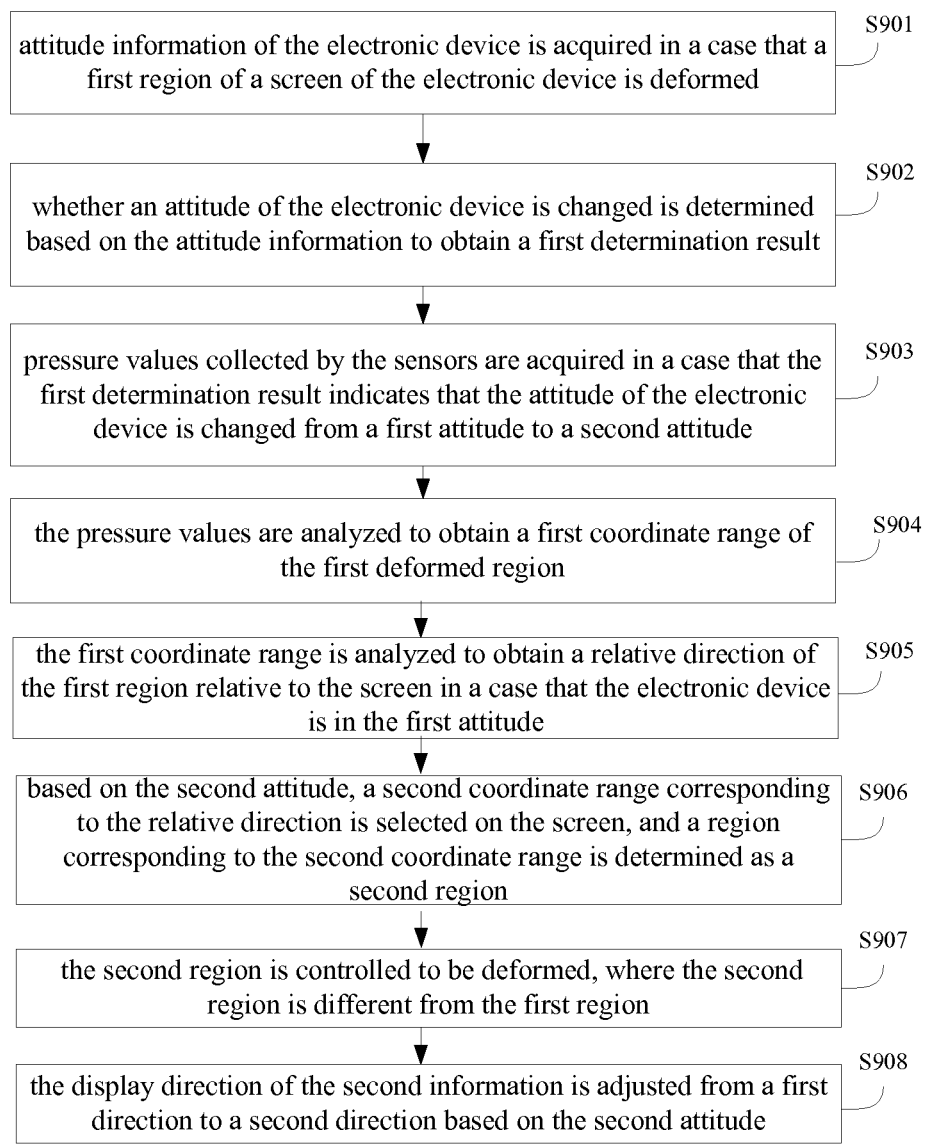
FIG. 9 is a flowchart of a sixth embodiment of a screen control method according to the present disclosure.

FIG. 9 is a flowchart of a sixth embodiment of a screen control method according to the present disclosure. The method may include the following step S901 to step S908.

In step S901, attitude information of the electronic device is acquired in a case that a first region of a screen of the electronic device is deformed.

In step S902, whether an attitude of the electronic device is changed is determined based on the attitude information to obtain a first determination result.

Step S901 to step S902 are the same as step S601 to step S602 in the fourth embodiment, which are not described in the embodiment.

In step S903, pressure values collected by the sensors are acquired in a case that the first determination result indicates that the attitude of the electronic device is changed from a first attitude to a second attitude.

In a case that the first determination result indicates that the attitude of the electronic device is changed, pressure values collected by respective sensors are acquired, and each of the pressure values indicates a pressure at a collecting position corresponding to a respective sensor.

The larger the pressure value is, the greater the deformation extent of a screen region at the collecting position corresponding to the sensor is. In a specific implementation, the deformation extent may be indicated by a bending angle.

It should be noted that, each pressure value collected by a respective sensor is acquired to determine a respective deformation extent of the screen region at the collecting position corresponding to the sensor, and the deformed region may also be determined based on the collecting position corresponding to the sensor.

In step S904, the pressure values are analyzed to obtain a first coordinate range of the first deformed region.

The first deformed region is determined by analyzing pressure values collected by the sensors.

Specifically, the pressure values are compared with a preset threshold respectively; in a case that the pressure value is greater than the preset threshold, it is determined that the screen region at a collecting position corresponding to a sensor which collects the pressure value is deformed. Based on coordinates of the collecting position corresponding to the sensor, the first coordinate range of the first deformed region may be determined; the deformed region corresponding to the first coordinate range may be an edge region or a corner region of the display screen of the electronic device, a region located at the middle of the screen, or a strip region throughout the screen.

In step S905, the first coordinate range is analyzed to obtain a relative direction of the first region relative to the screen in a case that the electronic device is in the first attitude.

Specifically, the first coordinate range may be a corresponding region of the screen of the electronic device in a coordinate system. Based on the first coordinate range, a relative direction of the first region relative to the screen is determined in a case that the electronic device is in the first attitude.

Specifically, the relative direction relative to the screen may be understood as a relative direction relative to the user, for example, relative positions such as left side, right side and upper side.

In step S906, based on the second attitude, a second coordinate range corresponding to the relative direction is selected on the screen, and a region corresponding to the second coordinate range is determined as a second region.

The second coordinate range corresponds to the first coordinate range based on the relative direction. The shape of the second region matches the shape of the first region, which may refer to that for the first region and the second region, lengths and widths are the same respectively, the widths are the same and the lengths are different, or the lengths are the same and the widths are different.

It should be noted that, since an area of the collecting region corresponding to the sensor is determined, for example, 5 mm×5 mm, a control precision of the deformed region may be ensured by adding the number of sensors and decreasing the area of the collecting region corresponding to each sensor.

Specifically, the sensors are distributed densely on the screen of the electronic device and cover the entire screen, thereby collecting information (a pressure value) corresponding to each deformation on the screen.

Figure 10:
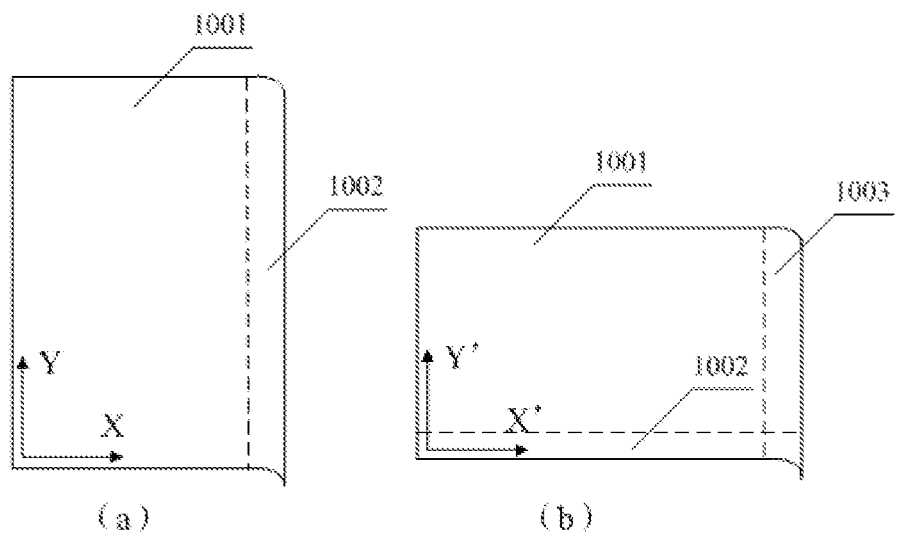
FIG. 10 is a schematic diagram of a screen of an electronic device in two attitudes according to the sixth embodiment of the screen control method of the present disclosure.

As a specific example, FIG. 10(*a*) and FIG. 10(*b*) show schematic diagrams of a screen according to an embodiment of the present disclosure. FIG. 10(*a*) shows a schematic diagram of the screen in a first attitude and FIG. 10(*b*) shows a schematic diagram of the screen in a second attitude.

As shown in FIG. 10(*a*), in a case that the electronic device is in the first attitude, i.e., a vertical screen attitude, the coordinate system of the electronic device is an XY coordinate system taking a lower left corner of a screen 1001 as the origin, and in the XY coordinate system, the right direction represents a positive direction of the X axis, and the upper direction represents a positive direction of the Y axis. The first region 1002 is deformed, and the first region 1002 is located on the right side relative to the user in a case that the electronic device is in the first attitude.

As shown in FIG. 10(*b*), in a case that the electronic device is in the second attitude, i.e., a horizontal screen attitude, the coordinate system of the electronic device is an X'Y' coordinate system taking a left lower corner of the screen 1001 as the origin, and in the X'Y' coordinate system, the right direction represents a positive direction of the X' axis, and the upper direction represents a positive direction of the Y' axis. The deformation of the first region 1002 is removed, a second region 1003 is deformed, and the second region 1003 is located on the right side relative to the user in a case that the electronic device is in the second attitude.

In step S907, the second region is controlled to be deformed, where the second region is different from the first region.

In step S908, the display direction of the second information is adjusted from a first direction to a second direction based on the second attitude.

Step S907 to S908 are the same as step S604 to S605 in the fourth embodiment, which are not described in the embodiment.

In view of above, in the screen control method according to the embodiment, the electronic device is provided with at least two sensors, each of the at least two sensors is configured to detect a pressure value of a respective preset region on the screen, and the selecting a second region of the screen based on the second attitude includes: acquiring pressure values collected by the sensors; analyzing the pressure values to obtain a first coordinate range of the deformed first region; analyzing the first coordinate range to obtain a relative direction of the first region relative to the screen in a case that the electronic device is in the first attitude; selecting, based on the second attitude, a second coordinate range corresponding to the relative direction on the screen and determining a region corresponding to the second coordinate range as a second region. With the method, based on the pressure values of the preset regions of the screen collected by the sensors, the first coordinate range of the deformed first region is determined on the screen, thereby determining the relative direction of the deformed region relative to the screen in a case that the electronic device is in the first attitude; based on the relative direction, the second coordinate range corresponding to the relative direction is selected in a case that the electronic device is in the second attitude; in the above processes, only simple analysis on the pressure values collected by the sensors is needed, which has small amount of data processed and is easy to be achieved.

Figure 11:
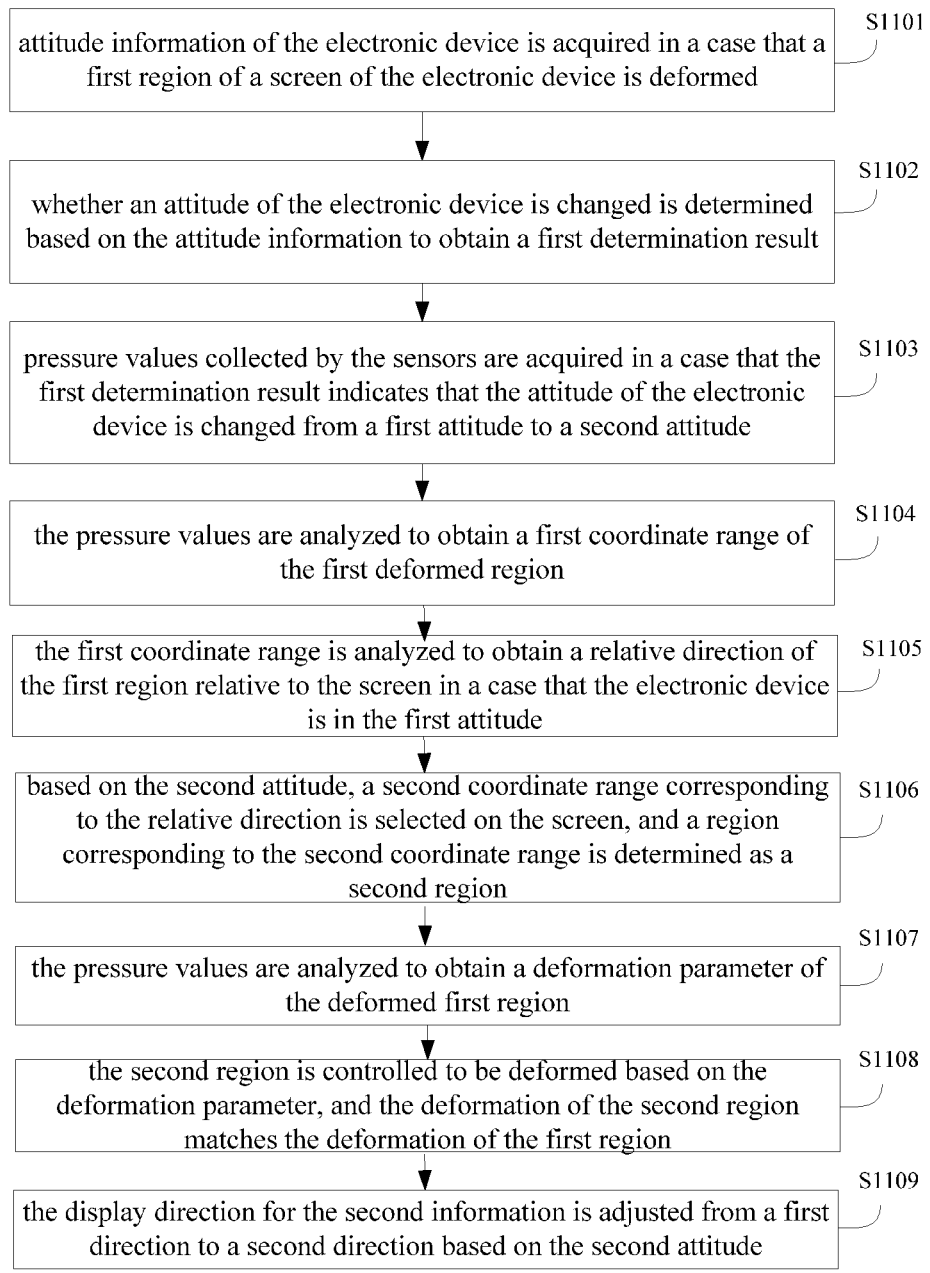
FIG. 11 is a flowchart of a seventh embodiment of a screen control method according to the present disclosure.

FIG. 11 is a flowchart of a seventh embodiment of a screen control method according to the present disclosure. The method may include following step S1101 to step S1109.

In step S1101, attitude information of the electronic device is acquired in a case that a first region of a screen of the electronic device is deformed.

In step S1102, whether an attitude of the electronic device is changed based on the attitude information to obtain a first determination result.

In step S1103, pressure values collected by sensors are acquired in a case that the first determination result indicates that the attitude of the electronic device is changed from a first attitude to a second attitude.

In step S1104, the pressure values are analyzed to obtain a first coordinate range of the deformed first region.

In step S1105, the first coordinate range is analyzed to obtain a relative direction of the first region relative to the screen in a case that the electronic device is in the first attitude.

In step S1106, a second coordinate range corresponding to the relative direction is selected on the screen based on the second attitude, and a region corresponding to the second coordinate range is determined as a second region.

Step S1101 to step S1106 are the same as step S901 to step S906 in the sixth embodiment, which are not described in the embodiment.

In step S1107, the pressure values are analyzed to obtain a deformation parameter of the deformed first region.

The pressure values collected by the sensors are analyzed to obtain the deformation parameter of the deformed first region.

The deformation parameter may be expressed as a deformation extent. The greater the pressure value is, the greater the deformation extent of the screen region at a collecting position corresponding to the sensor is.

In a specific implementation, the deformation extent may be represented by a bending angle or a curling angle, etc.

Specifically, the deformed first region of the screen is determined by comparing the pressure values with a preset threshold, and the deformation parameter of the first region is obtained by analyzing the pressure value greater than the preset threshold, thereby reducing the amount of data processed.

It should be noted that, the electronic device may be deformed along different directions, for example, the electronic device may be deformed upwardly or downwardly along the display direction of the screen. Specifically, the upward direction refers a direction from inside to outside of the electronic device relative to the content displayed on the screen, and accordingly the downward direction refers to a direction from outside to inside of the electronic device relative to the content displayed on the screen.

In a specific implementation, pressure values collected by the sensors may be labeled with a plus sign or a minus sign based on a pressure generation direction. The positive direction indicates a downward direction along the display direction of the screen, and the negative direction indicates an upward direction along the display direction of the screen.

In step S1108, the second region is controlled to be deformed based on the deformation parameter, and the deformation of the second region matches the deformation of the first region.

In a case that it is determined that the electronic device is in the first attitude and after the deformation parameter of the first region is obtained, the second region is controlled to be deformed based on the deformation parameter of the first region, such that the deformation of the second region matches the deformation of the first region.

Specifically, the matching between the deformation of the second region and the deformation of the first region may be a matching between the deformation extent of the second region and the deformation extent of the first region.

As a specific example, in a case that the first region is curled along an edge, the second region is controlled to also be curled along the edge. If the first region is located on the right side of the display screen in a case that the electronic device is in the first attitude, the second region is located on the right side of the display screen in a case that the electronic device is in the second attitude.

In step S1109, the display direction for the second information is adjusted from a first direction to a second direction based on the second attitude.

Step S1109 is the same as step S908 in the sixth embodiment, which is not described in the embodiment.

In view of above, in the screen control method according to the embodiment, the controlling the second region to be deformed includes: analyzing the pressure values to obtain a deformation parameter of the deformed first region; and controlling the second region to be deformed based on the deformation parameter, where the deformation of the second region matches the deformation of the first region. With the method, the pressure values collected by the sensors are analyzed to obtain the deformation parameter of the deformed first region, and the second region is controlled to be deformed based on the deformation parameter, such that the deformation of the second region matches the deformation of the first region, which ensures that for the user, the deformed region of the electronic device can change as the attitude of the electronic device changes, the position of the deformed region does not change relative to the user, and the deformation extent is not changed, thereby meeting the usage habit of the user and improving user experience.

The screen of the electronic device is divided into at least four standard regions, each of the at least four standard regions is provided with a power supply circuit, and the power supply circuits may be connected in parallel.

Figure 12:
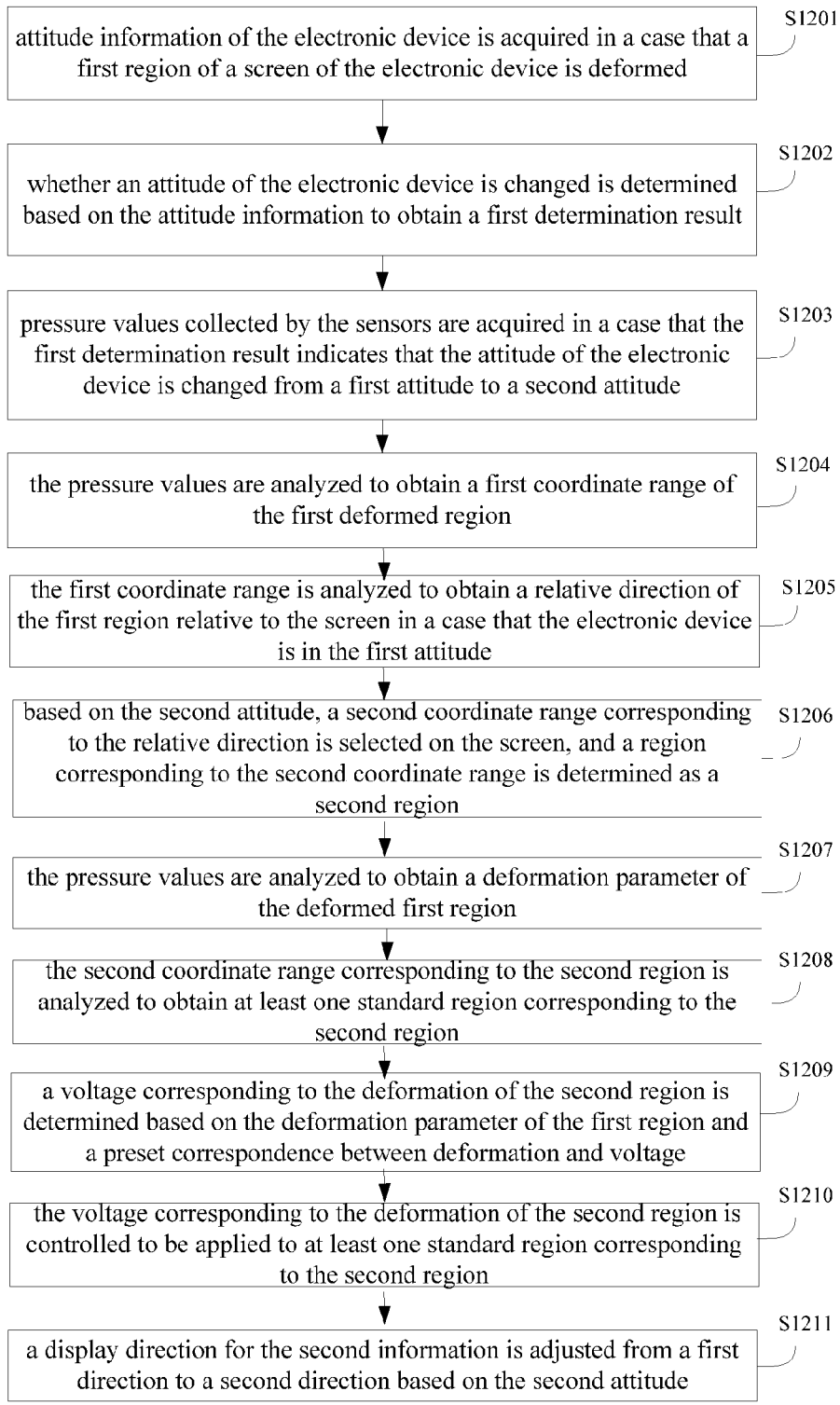
FIG. 12 is a flowchart of an eighth embodiment of a screen control method according to the present disclosure.

FIG. 12 is a flowchart of an eighth embodiment of a screen control method according to the present disclosure. The method may include the following step S1201 to step S1211.

In step S1201, attitude information of the electronic device is acquired in a case that a first region of a screen of the electronic device is deformed.

In step S1202, whether an attitude of the electronic device is changed is determined based on the attitude information to obtain a first determination result.

In step S1203, pressure values collected by the sensors are acquired in a case that the first determination result indicates that the attitude of the electronic device is changed from a first attitude to a second attitude.

In step S1204, the pressure values are analyzed to obtain a first coordinate range of the deformed first region.

In step S1205, the first coordinate range is analyzed to obtain a relative direction of the first region relative to the screen in a case that the electronic device is in the first attitude.

In step S1206, a second coordinate range corresponding to the relative direction is selected on the screen based on the second attitude, and a region corresponding to the second coordinate range is determined as a second region.

In step S1207, the pressure values are analyzed to obtain a deformation parameter of the deformed first region.

Step S1201 to step S1207 are the same as step S1101 to step S1107 in the seventh embodiment, which are not described in the embodiment.

In step S1208, the second coordinate range corresponding to the second region is analyzed to obtain at least one standard region corresponding to the second region.

Firstly, it should be noted that, the screen of the electronic device is divided into at least four standard regions. Each standard region has a constant area, and has a respective standard coordinate range.

The second coordinate range corresponding to the second region represents the deformed region, and at least one standard region corresponding to the second coordinate range is determined based on the second coordinate range.

Figure 13:
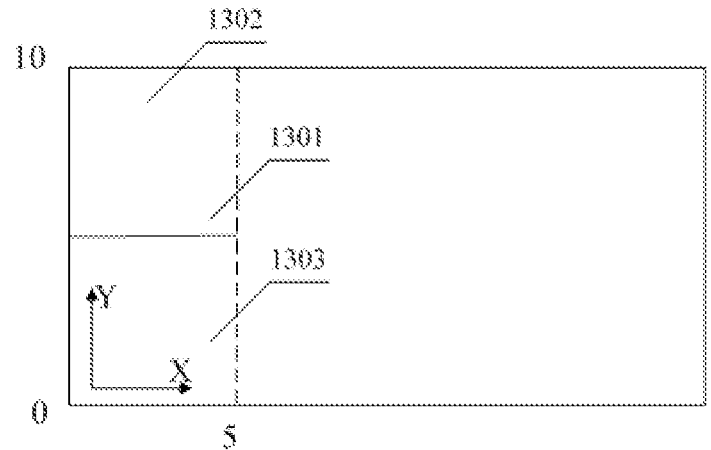
FIG. 13 is a schematic diagram of a second region according an eighth embodiment of the screen control method according to the present disclosure.

As a specific example, FIG. 13 shows a schematic diagram of the second region according to the embodiment of the present disclosure. The standard region has a length of 5 and a width of 5, the second coordinate range is a rectangular region 1301 with x ranging from 0 to 5 and y ranging from 0 to 10; a region consisted of the standard regions 1302 and 1303 matches the second coordinate range, and the standard regions corresponding to the second region are determined as the standard regions 1302 and 1303.

In step S1209, a voltage corresponding to the deformation of the second region is determined based on the deformation parameter of the first region and a preset correspondence between deformation and voltage.

It should be noted that, the extent of the deformation of the screen of the electronic device is relative to a voltage applied to the corresponding power supply circuit, that is, the screen of the electronic device has a deformation-voltage correspondence.

Specifically, the voltage corresponding to the deformation of the second region is obtained based on the deformation parameter of the first region and the deformation-voltage correspondence.

In a specific implementation, each of the standard regions is provided with a power supply circuit, and the power supply circuits may be connected in parallel.

In step S1210, the voltage corresponding to the deformation of the second region is controlled to be applied to at least one standard region corresponding to the second region.

In a case that the standard region corresponding to the second region is determined, the power supply circuit, to which a deformation voltage is to be applied, may be determined, and the voltage corresponding to the deformation of the second region is applied to the power supply circuit.

It should be noted that, in a case that the power supply circuit is powered on, a region corresponding to the power supply circuit is deformed. The magnitude of the supplied voltage is relative to, generally is positively correlated to, the deformation extent of the corresponding region, that is, the higher the supplied voltage is, the greater the deformation extent is.

Specifically, in a case that it is determined that the second region includes at least one standard region, respective voltages are provided for sub-regions based on respective positions of the at least one standard region and respective deformation extents of sub-regions of the second region.

In a specific implementation, in a case that the deformation is a folding deformation, the middle portion of the first deformed region has a greater pressure value, and two side portions of the first deformed region have smaller pressure values; accordingly, the middle portion of the second deformed region has greater deformation, a higher voltage needs to be provided for a power supply circuit corresponding to a standard region located at the middle position of the second region; and similarly, the two side portions of the second region has smaller deformation, a low voltage needs to be provided for a power supply circuit corresponding to a standard region located at each side of the second region, such that different standard regions correspond to different voltages, different voltages are provided based on positions of the standard regions, thereby achieving the matching between the deformation of the second region and the deformation of the first region.

It should be noted that, the smaller the area of the standard region is, the higher the control precision of the deformation is.

In step S1211, a display direction for the second information is adjusted from a first direction to a second direction based on the second attitude.

Step S1211 is the same as step S1109 in the seventh embodiment, which is not described in the embodiment.

In view of above, in the screen control method according to the embodiment, the screen is divided into at least four standard regions, each of the at least four standard regions is provided with a respective power supply circuit, and the controlling the second region to be deformed based on the deformation parameter includes: analyzing a second coordinate range corresponding to the second region to obtain at least one standard region corresponding to the second region; determining a voltage corresponding to the deformation of the second region based on the deformation parameter of the first region and a preset correspondence between deformation and voltage; and controlling to apply the voltage corresponding to the deformation of the second region to at least one standard region corresponding to the second region. With the method, the screen is divided into multiple standard regions, and each of the multiple standard regions may be controlled independently. The deformation of the standard region is controlled by powering the supply power circuit corresponding to the standard region. After the second coordinate range of the second region is determined, multiple standard regions corresponding to the second region are determined; the voltage corresponding to the deformation of the second region is determined based on the deformation parameter of the first region and the preset correspondence between deformation and voltage, and the voltage is provided for power supply circuits of the multiple standard regions corresponding to the second region, such that the deformation of the second region is controlled and the deformation of the second region matches the deformation of the first region, which ensures that for the user, the deformed region of the electronic device can change as the attitude of the electronic device changes, the position of the deformed region does not change relative to the user, and the deformation extent is not changed, thereby meeting the usage habit of the user and improving user experience.

Figure 14:
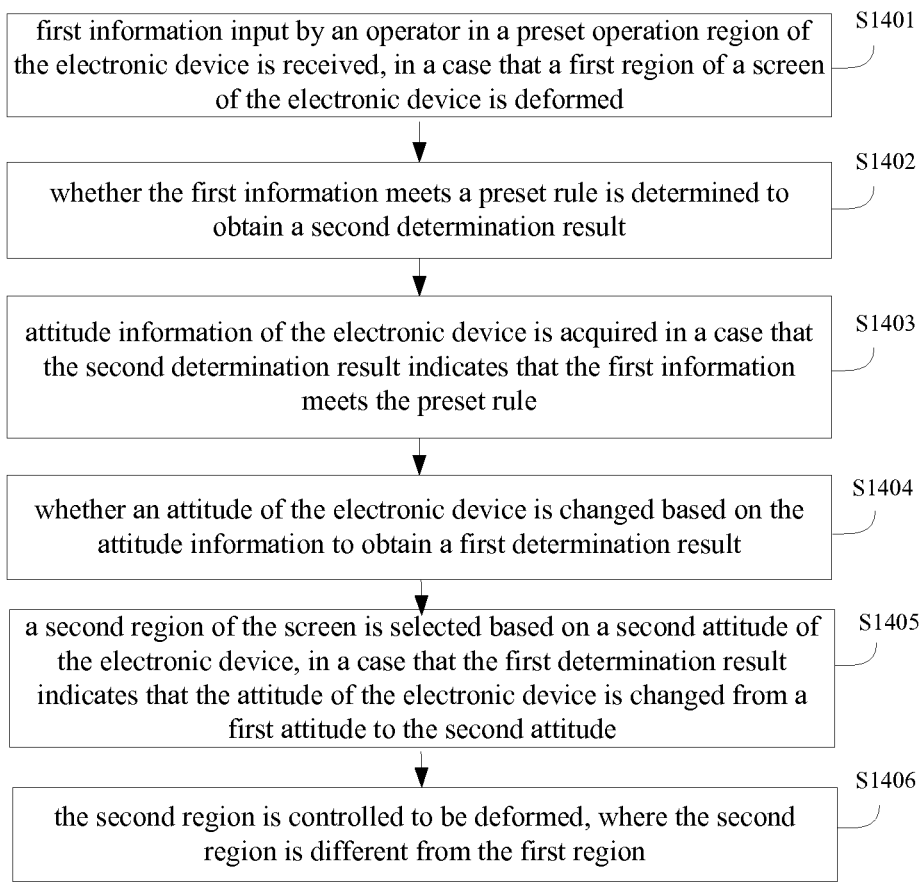
FIG. 14 is a flowchart of a ninth embodiment of a screen control method according to the present disclosure.

FIG. 14 is a flowchart of a ninth embodiment of a screen control method according to the present disclosure. The method may include the following step S1401 to step S1406.

In step S1401, first information input by an operator in a preset operation region of the electronic device is received, in a case that a first region of a screen of the electronic device is deformed.

The operation region of the electronic device is preset, and the operator can input information on the preset operation region.

Specifically, after the first region of the screen of the electronic device is deformed, the first information input by the operator on the preset operation region is received.

Specifically, the preset operation region may be a preset touch key, a physical key or other structures or elements for inputting information, which is not limited in the embodiment.

In step S1402, whether the first information meets a preset rule is determined to obtain a second determination result.

The preset rule is operation information for starting a function of automatically adjusting deformation.

Specifically, the first information is compared with the preset rule; if the first information matches the preset rule, it is determined that the first information meets the preset rule; otherwise, it is determined that the first information does not meet the preset rule.

It should be noted that, the first information indicates an operation of the operator, and whether to perform a subsequent solution for automatically adjusting the deformed region based on the attitude of the electronic device is determined based on the operation. Since the implementation of the automatic-adjusting solution is controlled by the user, the participation degree of the user is improved and since the deformed region is automatically adjusted according to the requirement of the user, user experience is improved.

In step S1403, attitude information of the electronic device is acquired in a case that the second determination result indicates that the first information meets the preset rule.

In step S1404, whether an attitude of the electronic device is changed based on the attitude information to obtain a first determination result.

In step S1405, a second region of the screen is selected based on a second attitude of the electronic device, in a case that the first determination result indicates that the attitude of the electronic device is changed from a first attitude to the second attitude.

In step S1406, the second region is controlled to be deformed, where the second region is different from the first region.

Step S1403 to step S1406 are the same as step S101 to step S104 in the first embodiment, which are not described in the embodiment.

In view of above, in the screen control method according to the present embodiment, before the acquiring attitude information of the electronic device, the method further includes: receiving first information input by an operator in a preset operation region of the electronic device; determining whether the first information meets a preset rule to obtain a second determination result; and acquiring the attitude information of the electronic device, in a case that the second determination result indicates that the first information meets the preset rule. With the method, the first information input by the operator is received and whether to perform the subsequent solution for adjusting automatically the deformed region based on the attitude of the electronic device is determined, thus the user has a high participation degree and an improved experience.

The screen control method is described in detail according to the embodiments of the present disclosure above. The screen control method according to the present disclosure may be implemented by multiple forms of devices. Hence, an electronic device to which the screen control method is applied is further provided according to the present disclosure. Hereinafter the electronic device is described in detail according to the specific embodiments.

Figure 15:
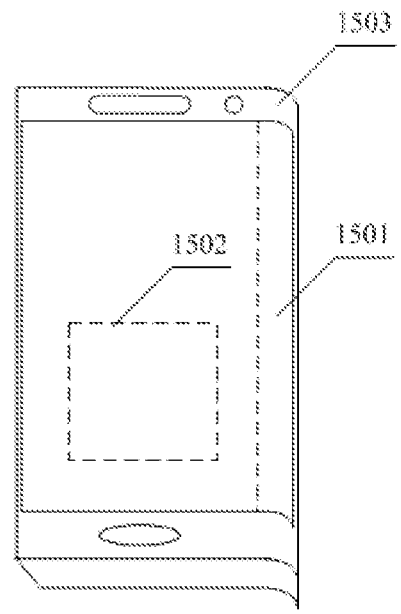
FIG. 15 is a schematic structural diagram of a first embodiment of an electronic device according to the present disclosure.

FIG. 15 is a schematic structural diagram of a first embodiment of an electronic device according to the present disclosure. The electronic device is deformable, and the electronic device can be deformed by an external force. The electronic device may be a desktop computer, a notebook computer, a tablet computer, a mobile phone, a smart television, a smart watch or a wearable device, etc.

The electronic device may include a screen 1501, a processor 1502 and a casing 1503.

The screen 1501 is deformable.

The processor 1502 is connected to the screen 1501 and configured to: acquire attitude information of the electronic device in a case that a first region of the screen of the electronic device is deformed; determine whether an attitude of the electronic device is changed based on the attitude information to obtain a first determination result; select a second region of the screen based on a second attitude of the electronic device, in a case that the first determination result indicates that the attitude of the electronic device is changed from a first attitude to the second attitude; and control the second region to be deformed, where the second region is different from the first region.

The casing 1503 bears the screen 1501 and the processor 1502, and the casing can be deformed, which matches the deformation of the screen so as to ensure the integrity of the deformation of the electronic device.

In a specific implementation, on the screen of the electronic device, the deformed first region may display the first information. The first information may be common information, for example, time or a weather report.

Specifically, the electronic device is provided with a graphic processing unit (GPU) and controls a content displayed on the screen through the CPU. In the embodiment, an image may be displayed independently on the first region by controlling the GPU.

In a specific implementation, image display may be controlled independently by a part of modules of GPU, or a module of GPU may alternatively control a content displayed on the first region and a content displayed on other region of the screen. The way for controlling the content displayed on the first region and the content displayed on other region of the screen by the GPU is not limited in the embodiment.

Specifically, the attitude information of the electronic device includes various types of information indicating the attitude of the electronic device, such as a horizontal screen attitude and a vertical screen attitude.

In a specific implementation, the electronic device is provided with devices such as a gravity sensor and a six-axis gyroscope, which can detect the attitude of the electronic device, to acquire the attitude information of the electronic device.

It should be noted that, in the embodiment, the attitude information of the electronic device is detected by the gravity sensor and the six-axis gyroscope, which is not limited herein; and in a specific implementation, the attitude of the electronic device may also be detected by other apparatuses or devices.

It should be noted that, the horizontal screen attitude of the electronic device is not limited to a state in which a longer edge of the electronic device is parallel with the horizontal plane and may be a state in which an angle between the longer edge and the horizontal plane is smaller than a preset angle, such that a content is displayed on the electronic device based on the horizontal screen attitude. The vertical screen attitude has the same principle as the horizontal screen attitude, which is not described herein.

The change of the attitude of the electronic device may be a transition from the horizontal screen attitude to the vertical screen attitude, or may be a transition from the vertical screen attitude to the horizontal screen attitude.

In a specific implementation, the attitude information of the electronic device may be acquired in real time; latest attitude information acquired is compared with attitude information acquired in the last period and whether the attitude of the electronic device is changed is determined based on the comparison result. In a case that the latest attitude information is the same as the attitude information acquired in the last period, it is determined that the attitude of the electronic device is not changed. In a case that the latest attitude information is not the same as the attitude information acquired in the last period, it is determined that the attitude of the electronic device is changed.

Specifically, in a case that the attitude of the electronic device is changed, it is indicated that a posture of a user with respect to holding the electronic device or a posture of a placement of the electronic device is changed, thereby resulting in change of the position of the deformed first region of the screen of the electronic device relative to the user.

In a case that the first determination result indicates that the attitude of the electronic device is changed, for example, the attitude of the electronic device is changed from the first attitude to the second attitude, where the first attitude and the second attitude represent different attitudes.

Specifically, in a case that the attitude of the electronic device is changed from the first attitude to the second attitude, the second region is selected from the screen of the electronic device based on the second attitude, where the second region is different from the first region.

In a specific implementation, the position of the second region relative to the user is the same as the position of the first region relative to the user. For example, if the first region is located on the right side of the user, the second region is a region of the screen located on the right side of the user after the attitude of the electronic device is changed, thereby ensuring that the user can continue his usage habit.

After the second region is selected, the second region is controlled to be deformed. The manner and extent of the deformation of the second region may refer to the deformation of the first region.

Figure 16:
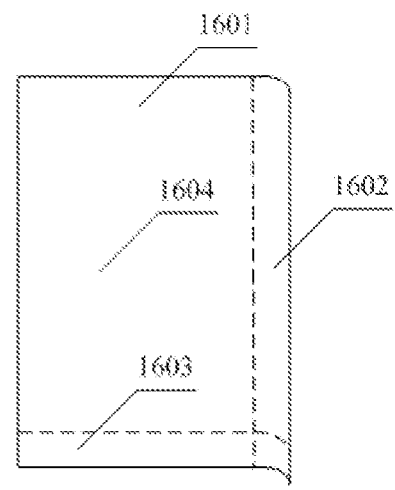
FIG. 16 is a schematic diagram of a screen according to the first embodiment of the electronic device of the present disclosure.

It should be noted that, in a case that the first region of the screen of the electronic device is deformed and the attitude of the electronic device is changed from the first attitude to the second attitude, the deformed region is adjusted based on the second attitude, such that the deformed region is adjusted to be located at a position corresponding to the position where the deformed region is located before the change of the attitude, based on the attitude of the electronic device, which ensures that for the user, the deformed region of the electronic device can change as the attitude of the electronic device changes, and the position of the deformed region does not change relative to the user, thereby meeting the usage habit of the user and improving user experience. FIG. 16 is a schematic diagram of the screen according to the first embodiment of the electronic device of the present disclosure. The screen 1601 may be divided into three regions: a first region 1602, a second region 1603 and a remaining region 1604. The first region 1602 is configured for displaying the first information, the second region 1603 is configured for displaying the first information, and the screen is configured for displaying the second information.

Specifically, in a case that the electronic device is in the first attitude, the first information is displayed on the first region 1602; and in order to ensure a display effect of the second information, the second information is displayed on a region consisting of the second region and the remaining region of the screen. In a case that the electronic device is in the second attitude, the first information is displayed on the second region 1603; and in order to ensure a display effect of the second information, the second information is displayed on a region consisting of the first region and the remaining region of the screen.

In view of above, the electronic device according to the embodiment includes: a deformable screen; a processor, connected to the screen, configured to acquire attitude information of the electronic device in a case that a first region of the screen of the electronic device is deformed, determine whether an attitude of the electronic device is changed based on the attitude information to obtain a first determination result, select a second region of the screen based on a second attitude of the electronic device in a case that the first determination result indicates that the attitude of the electronic device is changed from a first attitude to the second attitude, and control the second region to be deformed, where the second region is different from the first region; and a casing for bearing the screen and the processor, where the casing can be deformed which matching the deformation of the screen. With the electronic device, in a case that the first region of the screen of the electronic device is deformed and the attitude of the electronic device is changed, the deformed region is adjusted based on the changed attitude of the electronic device, such that the deformed region is adjusted to be located at a corresponding position based on the attitude of the electronic device, which ensures that for the user, the deformed region of the electronic device can change as the attitude of the electronic device changes, and the position of the deformed region does not change relative to the user, thereby meeting the usage habit of the user and improving user experience.

Figure 17:
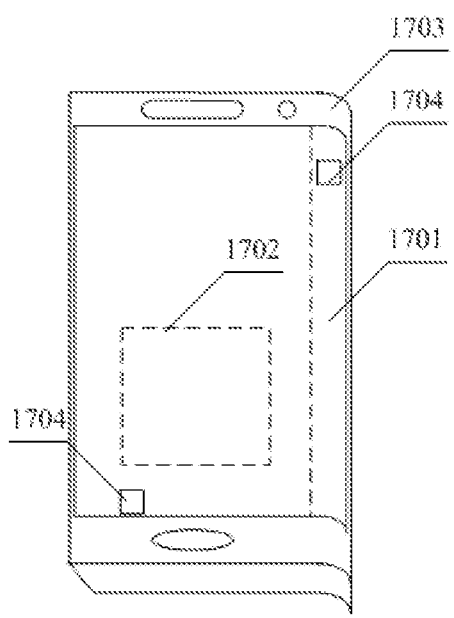
FIG. 17 is a schematic structural diagram of a second embodiment of an electronic device according to the present disclosure.

FIG. 17 is a schematic structural diagram of a second embodiment of an electronic device according to the present disclosure. The electronic device may include: a screen 1701, a processor 1702, a casing 1703 and at least two sensors 1704.

Structures and functions of the screen 1701, the processor 1702 and the casing 1703 are the same as those in the first embodiment, which are not described in the embodiment.

The at least two sensors 1704 are arranged at at least two preset positions of the electronic device, and each of the at least two sensors is configured to detect a pressure value of a respective preset region of the screen.

In FIG. 17, two sensors are taken as an example for illustration, and the sensors collect pressure values of the screen of the electronic device at a first position and a second position.

It should be noted that, in a specific implementation, in a case that the region within which the sensors detest the pressure values is determined, lots of sensors may be arranged, that is, the sensors are distributed densely on the screen, to detect pressure values of the screen accurately.

It should be noted that, the processor can acquire a respective pressure value collected by each sensor to determine a deformation extent of a screen region at a collecting position corresponding to the sensor, and the determined region may be determined based on the collecting position corresponding to the sensor, thereby controlling the deformation of the second region. The way of controlling the deformation of the second region may refer to the description in the method embodiment, which is not described in the embodiment.

The embodiments of the present disclosure are described herein in a progressive manner, and each embodiment places emphasis on the difference from other embodiments, therefore one embodiment can refer to other embodiments for the same or similar parts. For the device disclosed in the embodiments, since the device corresponds to the method disclosed in the embodiments, the description is relatively simple, and relevant part of the description may refer to the description according to the method embodiments.

With the above descriptions of the disclosed embodiments, those skilled in the art may achieve or use the present disclosure. Various modifications to the embodiments are apparent for those skilled in the art. The general principle defined herein may be implemented in other embodiments without departing from the spirit or scope of the disclosure. Therefore, the present disclosure is not limited to the embodiments disclosed herein, but confirm to the widest scope in consistent with the principle and the novel features disclosed herein.

The invention claimed is:

1. A screen control method, comprising:
   acquiring attitude information of an electronic device in a case that a first region of a screen of the electronic device is deformed;
   determining, based on the attitude information, whether an attitude of the electronic device is changed to obtain a first determination result;
   selecting a second region of the screen based on a second attitude of the electronic device in a case that the first determination result indicates that the attitude of the electronic device is changed from a first attitude to the second attitude; and
   controlling the second region to be deformed, wherein the second region is different from the first region, wherein, before the acquiring attitude information of the electronic device, the method further comprises:
    receiving first information input by an operator in a preset operation region of the electronic device;
    determining whether the first information meets a preset rule to obtain a second determination result; and
    acquiring the attitude information of the electronic device in a case that the second determination result indicates that the first information meets the preset rule.

2. The method according to claim 1, wherein first information is displayed on the first region, and after the controlling the second region to be deformed, the method further comprises:
    controlling the second region to display the first information.

3. The method according to claim 2, wherein in a case that the first determination result indicates that the attitude of the electronic device is changed from the first attitude to the second attitude, the method further comprises:
    controlling the first region to remove the deformation and to stop displaying the first information.

4. The method according to claim 1, wherein second information is displayed on the screen, and after the controlling the second region to be deformed, the method further comprises:
    adjusting, based on the second attitude, a display direction for the second information from a first direction to a second direction, wherein the first direction is a direction matching the first attitude and the second direction is a direction matching the second attitude.

5. The method according to claim 4, wherein first information is displayed on the first region of the screen, and after the controlling the second region to be deformed, the method further comprises:
    controlling the first region to stop displaying the first information; and
    controlling the second region to display the first information.

6. The method according to claim 4, wherein the electronic device is provided with at least two sensors, each of the at least two sensors is configured to detect a pressure value of a respective preset region on the screen, and the selecting a second region of the screen based on the second attitude comprises:
    acquiring pressure values collected by the sensors;
    analyzing the pressure values to obtain a first coordinate range of the deformed first region;
    analyzing the first coordinate range to obtain a relative direction of the first region relative to the screen in a case that the electronic device is in the first attitude; and
    selecting, based on the second attitude, a second coordinate range corresponding to the relative direction on the screen and determining a region corresponding to the second coordinate range as the second region.

7. The method according to claim 6, wherein the controlling the second region to be deformed comprises:
    analyzing the pressure values to obtain a deformation parameter of the deformed first region; and
    controlling, based on the deformation parameter, the second region to be deformed, wherein the deformation of the second region matches the deformation of the first region.

8. The method according to claim 7, wherein the screen is divided into at least four standard regions, each of the at least four standard regions is provided with a respective power supply circuit, and the controlling, based on the deformation parameter, the second region to be deformed comprises:
    analyzing the second coordinate range corresponding to the second region to obtain at least one standard region corresponding to the second region;
    determining, based on the deformation parameter of the first region and a preset correspondence between deformation and voltage, a voltage corresponding to the deformation of the second region; and
    controlling to apply the voltage corresponding to the deformation of the second region to the at least one standard region corresponding to the second region.

9. An electronic device, comprising:
    a deformable screen;
    a processor connected to the screen and configured to:
        acquire attitude information of the electronic device in a case that a first region of the screen of the electronic device is deformed;
        determine whether an attitude of the electronic device is changed based on the attitude information to obtain a first determination result;
        select a second region of the screen based on a second attitude of the electronic device, in a case that the first determination result indicates that the attitude of the electronic device is changed from a first attitude to the second attitude; and
        control the second region to be deformed, where the second region is different from the first region;
    a casing for bearing the screen and the processor, wherein the casing can be deformed, which matches the deformation of the screen; and
    the processor is further configured to, before the acquiring attitude information of the electronic device:
        receive first information input by an operator in a preset operation region of the electronic device;
        determine whether the first information meets a preset rule to obtain a second determination result; and
        acquire the attitude information of the electronic device in a case that the second determination result indicates that the first information meets the preset rule.

10. The electronic device according to claim 9, wherein the first region of the screen is configured for displaying first information, the second region of the screen is configured for displaying the first information, and the region of the screen is configured for displaying second information.

11. The electronic device according to claim 9, further comprising:
    at least two sensors arranged at at least two preset positions of the electronic device, wherein each of the at least two sensors is configured to detect a pressure value of a respective preset region on the screen.

12. An electronic device, comprising:
    a deformable screen;
    a processor connected to the screen; and
    a casing for bearing the screen and the processor, wherein the casing can be deformed, which matches a deformation of the screen,
    wherein the processor is configured to:
    acquire attitude information of the electronic device in a case that a first region of the screen of the electronic device is deformed;
    determine, based on the attitude information, whether an attitude of the electronic device is changed to obtain a first determination result;
    select a second region of the screen based on a second attitude of the electronic device in a case that the first determination result indicates that the attitude of the electronic device is changed from a first attitude to the second attitude; and control the second region to be deformed, wherein the second region is different from the first region, wherein second information is displayed on the screen, and the processor is further configured to:

after the controlling the second region to be deformed, adjust, based on the second attitude, a display direction for the second information from a first direction to a second direction, wherein the first direction is a direction matching the first attitude and the second direction is a direction matching the second attitude, wherein the electronic device is provided with at least two sensors, each of the at least two sensors is configured to detect a pressure value of a respective preset region on the screen, and the selecting a second region of the screen based on the second attitude comprises:

acquiring pressure values collected by the sensors;

analyzing the pressure values to obtain a first coordinate range of the deformed first region;

analyzing the first coordinate range to obtain a relative direction of the first region relative to the screen in a case that the electronic device is in the first attitude; and selecting, based on the second attitude, a second coordinate range corresponding to the relative direction on the screen and determining a region corresponding to the second coordinate range as the second region, wherein the controlling the second region to be deformed comprises:

analyzing the pressure values to obtain a deformation parameter of the deformed first region; and controlling, based on the deformation parameter, the second region to be deformed, wherein the deformation of the second region matches the deformation of the first region, wherein the screen is divided into at least four standard regions, each of the at least four standard regions is provided with a respective power supply circuit, and the controlling, based on the deformation parameter, the second region to be deformed comprises:

analyzing the second coordinate range corresponding to the second region to obtain at least one standard region corresponding to the second region;

determining, based on the deformation parameter of the first region and a preset correspondence between deformation and voltage, a voltage corresponding to the deformation of the second region; and controlling to apply the voltage corresponding to the deformation of the second region to the at least one standard region corresponding to the second region.

* * * * *